Aug. 13, 1940.   R. N. CARTER   2,210,882
PHOTOGRAPHIC APPARATUS
Filed Aug. 24, 1937
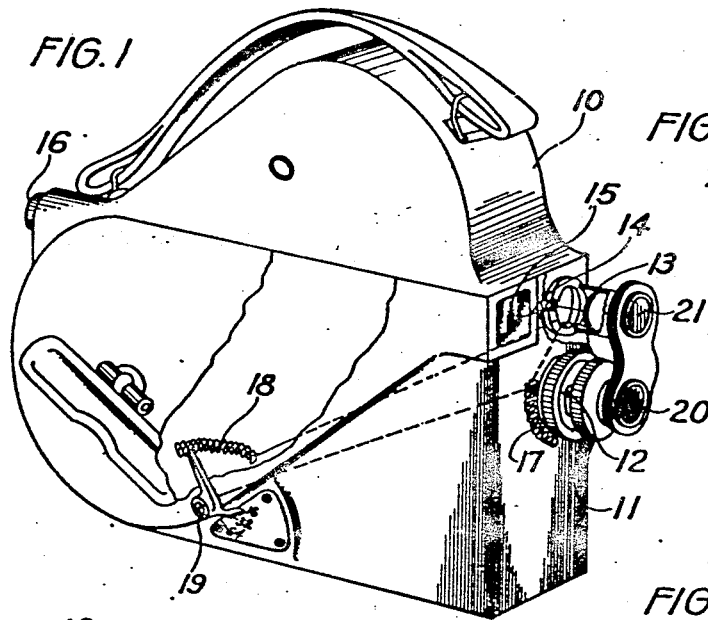
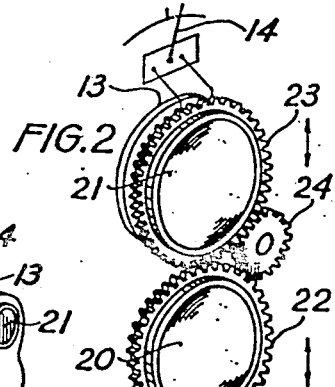
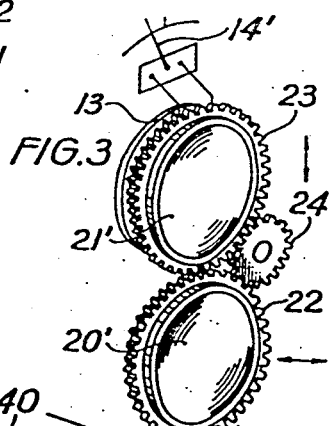
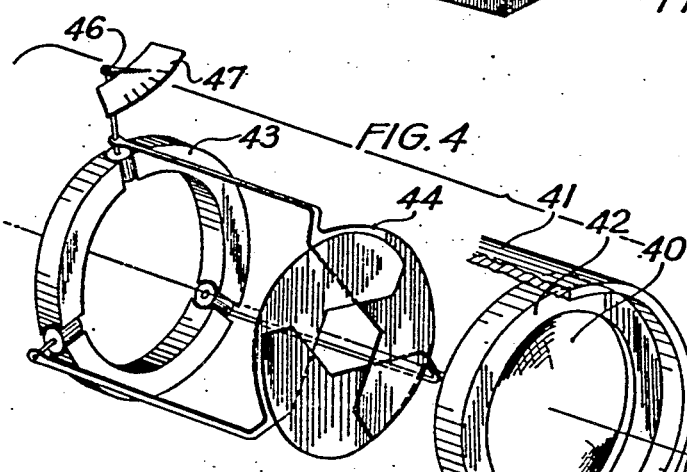
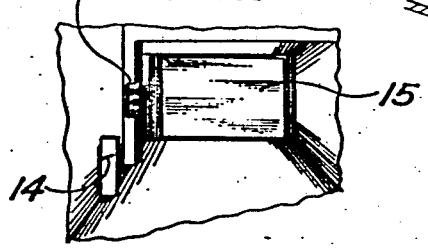
Rolla N. Carter
INVENTOR.
BY Newton M. Perriss
ATTORNEY.

Patented Aug. 13, 1940

2,210,882

UNITED STATES PATENT OFFICE 2,210,882

PHOTOGRAPHIC APPARATUS

Rolla N. Carter, Rochester, N. Y., assignor to Eastman Kodak Company, Rochester, N. Y., a corporation of New Jersey Application August 24, 1937, Serial No. 160,614

7 Claims. (Cl. 95—64)

This invention relates to photographic apparatus and particularly to apparatus for aiding the operator of a camera in setting or orienting a polarizing element being employed in making a photographic exposure.

Although polarizing mediums have been known for many years and their value in many photographic processes widely appreciated, it was not until the advent in recent years of polarizing material in sheet form that polarizing filters became available to the general public in a form convenient to use.

In the average scene reflecting enough polarized light to warrant the use of a polarizing filter in photographing it, such as scenes including sky, water or areas of smooth planes, it will be found that the light which the filter is used to absorb is polarized at substantially one azimuth—and that if the polarizing filter is oriented for maximum (or in some cases minimum) absorption the desired result in the photograph will more nearly be obtained.

It is an object of my invention to provide an arrangement whereby the operator of a camera may measure the effect a polarizing filter has on the light coming from a scene—and by so doing will automatically orient the filter for the ensuing exposure.

Another object of my invention is the provision of means in a camera equipped with automatic or semiautomatic exposure control whereby the exposure control apparatus is employed for guiding the operator in orienting the polarizing filter to be used.

A further object of my invention is to provide a camera with a photoelectric device for determining the adjustment of a polarizing filter which device also functions as an exposure guide or control.

My invention also provides that the effects of the polarizing filter will be taken into account by the semi-automatic or automatic exposure control when determining the correct exposure.

Other objects and advantages of my invention will be apparent from the following description when read in connection with the accompanying drawing in which, Figure 1 shows a camera incorporating my invention.

Figure 2 shows in detail the arrangement of polarizing filters as employed in the embodiment of the invention shown in Figure 1.

Figure 3 shows another arrangement of the polarizing filters which may be employed in a similar embodiment of the invention.

Figure 4 shows my invention incorporated in a fully automatic exposure control.

Figure 5 shows the field of view as seen through the view finder in an embodiment of my invention similar to that shown in Figure 1.

By way of illustration, I have show my invention incorporated on a motion picture camera, but it is to be understood that it is equally applicable to other types of photographic apparatus. The camera 10 is provided with an objective 11 having a diaphragm setting 12 and an exposure control system comprising a photoelectric cell 13 and a meter therefore having an indicating needle 14 visible in the field 15 of a view finder provided with an eyepiece 16. The electrical circuit of the exposure meter is provided with variable resistances 17 (operated by the diaphragm setting mechanism) and 18 (operated by a camera speed mechanism 19) in the usual way.

The polarizing filter 20 mounted in front of the camera objective 11 is coupled to an auxiliary filter 21 (as shown in Figure 2) so that the vibration axis of the two filters remain parallel as the filter 20 is rotated to give the well-known maximum dark sky effect or to reduce the glare from some non-metallic reflecting surface, the amount of light entering the camera lens is reduced to a minimum when the maximum effect of the filter is obtained. Thus, in accordance with my invention, the auxiliary polarizing filter 21 is provided to intercept the light reaching the exposure control device and hence as the filters 20 and 21 are rotated, the needle 14 moves back and forth between a maximum and a minimum value. The filter 20 is correctly oriented when the needle 14 shows a minimum reading.

After this minimum reading has been obtained, the diaphragm 12 of the camera objective 11 may be rotated (thus varying the resistance 17) until the needle 14 indicates that correct exposure conditions have been set up in accordance with the speed of the film used.

As shown in Figure 2 the polarizing filters 20 and 21 may be provided with any suitable coupling means such as gear mounts 22 and 23 connected by a gear wheel 24. Any suitable means for insuring that the two filters are rotated simultaneously in the same direction may be employed. The photoelectric exposure control device 13 and its accompanying meter needle 14 are shown schematically in this figure.

Under certain circumstances, such as at low intensity of illumination, it is more convenient to determine the exact orientation which gives a maximum meter reading rather than a minimum meter reading. In the special embodiment of my invention shown in Figure 3, the polarizing filter 20' and the auxiliary polarizing filter 21' are arranged with their vibration axes mutually perpendicular as indicated by the adjacent double-headed arrows. In this case, the maximum dark sky effect or maximum glare absorption by the filter 20' is obtained when the auxiliary filter 21' is in its maximum transmitting position. This particular system has one disadvantage over that shown in Figure 2. When the desired filter orientation has been reached, the filter 20' is transmitting a minimum amount of light whereas the filter 21' is transmitting the maximum amount of light and hence the reading indicated by the needle 14 is not indicative of the amount of light reaching the film through the camera objective. However, since the difference between the maximum and minimum readings of the needle 14 is in most cases relatively small, it is possible to allow for this discrepancy by bringing the needle to a reading somewhat higher than the usual index which indicates correct exposure conditions. In practice, the operator becomes aware of the exact difference between maximum and minimum scale readings as he is testing the effect of the polarizing filter, and hence can make accurate allowance for the discrepancy.

In both Figs. 2 and 3 the vibration axis of the cell filter has a rectilinear orientation with respect to that of the lens filter—parallel in one case and orthogonal in the other. The angle between the axes is zero in one case and 90° in the other; in every case this angle is one half of an angle whose sine is zero.

In Figure 4 a fully automatic system is shown in which a camera objective 40 is marginally surrounded by a photoelectric surface 42 both elements being mounted in the objective mount 41. The electrical connection between the photoelectric surface 42 and a triple galvanometer 43 is not shown in this figure. The rotating arms of the triple galvanometer 43 supports diaphragm blades 44 as is clearly evident in the drawing. According to my invention, one of the galvanometer arms is provided with an indicating needle 46 and scale 47 so that when a polarizing filter 45 is mounted in front of the objective 40 and rotated in the usual manner, the change in setting of the diaphragm blades 44 is indicated by this needle 46. When the polarizing filter 45 is oriented for maximum absorption, the diaphragm blades 44 automatically open to give a wide aperture, whereby the desired constant exposure level is maintained. Thus, my invention provides that the operator of the camera can readily determine by means of the needle 46 and scale 47 when this maximum absorption occurs.

For convenience, I prefer to mount this indicating needle so that it is visible in the view finder of the camera to which my invention has been applied. Figure 5 illustrates the simple manner in which this needle may be mounted in the field of view of a view finder such as that shown in Fig. 1. In the particular type of camera shown, a scale 30 is already provided in the field of the view finder to indicate the film footage. In a similar manner, the needle 14 is conveniently mounted to be visible in this field of view.

Having thus described the various embodiments of my invention and apparatus with which it may be employed, I wish to point out that it is not limited to the specific structures shown but is of the scope of the appended claims.

What I claim and wish to secure by Letters Patent of the United States is:

1. In a photographic camera the combination with a lens, of a polarizing filter rotatably mounted in front of the lens, a photoelectric device responsive to light reflected from a scene to be photographed, polarizing material mounted rotatably in front of the photoelectric device for modifying the light incident thereon, said polarizing material being mounted with its vibration axis in one of the rectilinear positions, parallel and orthogonal, with respect to that of said filter, means for rotating the filter and the material in synchronism for maintaining the relative orientation of the axes, and means for indicating the change in the response of the photoelectric device as the polarizing material is rotated in front thereof, whereby when the rate of said change in the response is zero, the polarizing filter is oriented for maximum or minimum absorption.

2. A photographic camera including an objective, a polarizing filter rotatably mounted in the path of the light passing through the objective and means for indicating when the filter is properly oriented for the maximum reduction of glare due to polarized light reflected from the scene to be photographed, said indicating means consisting of a photoelectric cell positioned to receive light from said scene, polarizing material rotatably mounted in front of the cell to affect the light incident thereon, said material being mounted with its vibration axis in one of the two rectilinear positions, parallel and orthogonal, relative to the vibration axis of the filter, means for rotating the polarizing material and the filter in synchronism to maintain the relative orientation of the axes and a meter connected to and operated by the cell for indicating the change of the response of the cell as the polarizing material is rotated in front thereof whereby the orientation for said maximum reduction of glare is indicated by a zero rate of change of the cell response, that is, by a minimum cell response when said vibration axes are parallel and by a maximum cell response when said vibration axes are orthogonal.

3. In a photographic camera having a lens, automatic means for adjusting the quantity of light passed through the lens in accordance with the light values of the scene to be photographed, said automatic means including a photoelectric cell positioned to receive light from said scene, a polarizing filter rotatably mounted in the path of the light through the lens, polarizing material rotatably mounted in front of the photoelectric cell with its vibration axis parallel to that of the filter, means for rotating the filter and the material in synchronism, and visible means for indicating the change in the response of the photoelectric cell as the polarizing material is rotated in front thereof, said indicating means consisting of a movable pointer operated by and in accordance with the output of the photoelectric cell.

4. In combination, a photographic camera, a lens for the camera, a polarizing filter rotatably mounted in the path of the light through the lens, a photoelectric cell positioned to receive light from the subject to be photographed, a second polarizing filter rotatably mounted in front of the cell with its vibration axis orthogonal to that of the first filter, means coupling the two filters for rotating them in synchronism whereby the orthogonalism between their axes is maintained and visible indicating means operated by the photoelectric cell for indicating when the response thereof is a maximum as the filters are rotated whereby there is indicated the position of the filters for maximum absorption by the first filter.

5. In combination, a photographic camera, a lens for the camera, a photoelectric cell positioned to receive light from the subject to be photographed without interfering with the light to be transmitted by the lens, a sheet of polarizing material in front of the lens, a sheet of polarizing material, at least partly different from that which is in front of the lens, in front of the photoelectric cell said materials having parallel vibration axes, means for rotating the materials without affecting the parallelism and visible indicating means operated by the photoelectric cell for indicating when the response thereof is a minimum as the materials are rotated whereby there is indicated the position of the materials for maximum absorption.

6. In combination, a photographic camera, a lens for the camera, a photoelectric cell laterally spaced from the lens to receive light from the subject to be photographed, a polarizing filter rotatably mounted in the path of the light through the lens, a second polarizing filter mounted in front of the photoelectric cell with its vibration axis at an angle to that of the first filter which angle is equal to one half of an angle whose sine is zero, means for rotating the two filters in synchronism whereby the parallelism or orthogonality of the vibration axes will not be affected and visible indicating means operated by the photoelectric cell for indicating when the response thereof passes through maxima and minima as the filter in front thereof is rotated.

7. In combination, a photographic camera, a lens for the camera, a polarizing filter rotatably mounted in front of the lens and means for indicating the orientation of the polarizing filter, said means consisting of a photoelectric cell positioned to receive light from the subject to be photographed without interfering with the light to be transmitted by the lens, polarizing material mounted in front of the cell, rotatable with said filter and with its vibration axis rectilinearly oriented with respect to that of the filter, means for rotating the material and the filter without altering the relative orientation of the axes and visible indicating means operated by the photoelectric cell for indicating when the response thereof passes through maxima and minima as the polarizing material is rotated.

ROLLA N. CARTER.